US008495017B2

(12) United States Patent
Lafont et al.

(10) Patent No.: US 8,495,017 B2
(45) Date of Patent: Jul. 23, 2013

(54) METHOD AND SYSTEM TO MAINTAIN STRONG CONSISTENCY OF DISTRIBUTED REPLICATED CONTENTS IN A CLIENT/SERVER SYSTEM

(75) Inventors: Caroline Lafont, Antibes (FR);
Guillaume Touffait, Valbonne (FR);
Yan Collendavelloo, Nice (FR);
Christophe Defayet, Grasse (FR);
Virginie Amar, Biot (FR)

(73) Assignee: Amadeus S.A.S., Sophia Antipolis (FR)

( * ) Notice: Subject to any disclaimer, the term of this patent is extended or adjusted under 35 U.S.C. 154(b) by 0 days.

(21) Appl. No.: 13/136,576

(22) Filed: Aug. 4, 2011

(65) Prior Publication Data
US 2013/0036092 A1 Feb. 7, 2013

(30) Foreign Application Priority Data
Aug. 3, 2011 (EP) .................................... 11306011

(51) Int. Cl.
*G06F 17/30* (2006.01)
(52) U.S. Cl.
USPC ............................ 707/634; 707/623; 707/638
(58) Field of Classification Search
CPC .......... G06F 17/30067; G06F 17/30575; G06F 17/30212
USPC .............. 707/634, 623, 638, 999.01, 999.201
See application file for complete search history.

(56) References Cited

U.S. PATENT DOCUMENTS

| | | | | |
|---|---|---|---|---|
| 5,566,304 | A * | 10/1996 | Regal ............................ | 710/105 |
| 5,721,909 | A * | 2/1998 | Oulid-Aissa et al. .................. | 1/1 |
| 5,835,757 | A * | 11/1998 | Oulid-Aissa et al. .................. | 1/1 |
| 6,411,991 | B1 * | 6/2002 | Helmer et al. ................. | 709/217 |
| 6,711,572 | B2 * | 3/2004 | Zakharov et al. ............. | 707/655 |
| 7,054,910 | B1 * | 5/2006 | Nordin et al. ................. | 709/208 |
| 7,243,103 | B2 * | 7/2007 | Murphy et al. ........................ | 1/1 |
| 7,305,585 | B2 * | 12/2007 | Marchand ....................... | 714/18 |
| 7,359,926 | B1 * | 4/2008 | Yohe et al. .................... | 707/610 |
| 7,401,192 | B2 * | 7/2008 | Stakutis et al. ............... | 711/162 |
| 7,500,020 | B1 | 3/2009 | Kabra et al. | |
| 7,548,928 | B1 * | 6/2009 | Dean et al. ............................ | 1/1 |
| 7,567,987 | B2 * | 7/2009 | Shappell et al. ...................... | 1/1 |

(Continued)

OTHER PUBLICATIONS

Triantafillou et al., "Achieving Strong Consistency in a Distributed File System", IEEE Transactions on Software Engineering, vol. 23, No. 1, Jan. 1997, pp. 35-55.*

(Continued)

*Primary Examiner* — Phuong Thao Cao
(74) *Attorney, Agent, or Firm* — Wood, Herron & Evans, LLP (57) ABSTRACT

A method and a system for maintaining consistency of replicated files distributed over a plurality of independent processing slave nodes part of an application tier of a multi-tier client/server data processing system are described. The replicated files are distributed from a master node of a master tier. Upon reception of an update request to update a master database a new version of a replicated file is first generated and stored in a shared file system. A notification of availability of the new version is forwarded to a synchronizing slave node and broadcasted to all slave nodes. Each slave node preloads the new version of the replicated file from the shared file system and acknowledges successful completion. Upon reception of all acknowledgments in the synchronization slave node a notification of preloading achievement is forwarded to the master server which updates the master database.

25 Claims, 5 Drawing Sheets

U.S. PATENT DOCUMENTS

| | | | |
|---|---|---|---|
| 7,571,215 B2* | 8/2009 | Jacobs et al. | 709/208 |
| 7,617,289 B2* | 11/2009 | Srinivasan et al. | 709/209 |
| 7,624,155 B1* | 11/2009 | Nordin et al. | 709/208 |
| 7,653,668 B1 | 1/2010 | Shelat et al. | |
| 7,962,458 B2* | 6/2011 | Holenstein et al. | 707/704 |
| 7,984,202 B2* | 7/2011 | Hofmann et al. | 710/22 |
| 8,108,352 B1* | 1/2012 | Iyer et al. | 707/661 |
| 8,301,600 B1* | 10/2012 | Helmick et al. | 707/648 |
| 2001/0039548 A1* | 11/2001 | Shinkai et al. | 707/201 |
| 2001/0042073 A1* | 11/2001 | Saether et al. | 707/203 |
| 2002/0042818 A1* | 4/2002 | Helmer et al. | 709/217 |
| 2003/0023618 A1 | 1/2003 | Orbits et al. | |
| 2003/0023898 A1* | 1/2003 | Jacobs et al. | 714/15 |
| 2003/0154238 A1* | 8/2003 | Murphy et al. | 709/201 |
| 2004/0006578 A1* | 1/2004 | Yu et al. | 707/201 |
| 2004/0068523 A1* | 4/2004 | Keith et al. | 707/200 |
| 2004/0073755 A1* | 4/2004 | Webb et al. | 711/144 |
| 2005/0091289 A1* | 4/2005 | Shappell et al. | 707/201 |
| 2005/0105701 A1* | 5/2005 | Tucciarone et al. | 379/93.25 |
| 2005/0192813 A1* | 9/2005 | Richard | 705/1 |
| 2006/0020645 A1* | 1/2006 | Hasegawa et al. | 707/204 |
| 2006/0075004 A1* | 4/2006 | Stakutis et al. | 707/204 |
| 2006/0190549 A1* | 8/2006 | Teramae et al. | 709/208 |
| 2007/0088702 A1* | 4/2007 | Fridella et al. | 707/10 |
| 2008/0148403 A1* | 6/2008 | Manion et al. | 726/22 |
| 2008/0168157 A1* | 7/2008 | Marchand | 709/219 |
| 2008/0195826 A1* | 8/2008 | Yamazaki et al. | 711/161 |
| 2008/0294860 A1* | 11/2008 | Stakutis et al. | 711/162 |
| 2009/0019549 A1* | 1/2009 | Reid | 726/27 |
| 2009/0063503 A1* | 3/2009 | Ward | 707/10 |
| 2009/0085738 A1* | 4/2009 | Darianian et al. | 340/539.11 |
| 2009/0119431 A1* | 5/2009 | Porath et al. | 710/110 |
| 2009/0157766 A1* | 6/2009 | Shen et al. | 707/202 |
| 2009/0300079 A1* | 12/2009 | Shitomi | 707/204 |
| 2009/0313311 A1* | 12/2009 | Hoffmann et al. | 707/204 |
| 2010/0274765 A1* | 10/2010 | Murphy et al. | 707/652 |
| 2011/0016100 A1* | 1/2011 | Ramasubramanian et al. | 707/695 |
| 2011/0131490 A1* | 6/2011 | Jeong et al. | 715/702 |
| 2011/0137854 A1* | 6/2011 | Walter | 707/608 |
| 2011/0173372 A1* | 7/2011 | Schuette | 711/102 |
| 2012/0011098 A1* | 1/2012 | Yamada | 707/623 |
| 2012/0023179 A1* | 1/2012 | Bernbo et al. | 709/206 |
| 2012/0023233 A1* | 1/2012 | Okamoto et al. | 709/226 |
| 2012/0079090 A1* | 3/2012 | Johnsen et al. | 709/223 |
| 2012/0089549 A1* | 4/2012 | Burckart et al. | 706/47 |
| 2012/0166407 A1* | 6/2012 | Lee et al. | 707/703 |
| 2012/0167098 A1* | 6/2012 | Lee et al. | 718/101 |
| 2013/0060737 A1* | 3/2013 | Koponen et al. | 707/634 |

OTHER PUBLICATIONS

Shen, H., "IRM: Integrated File Replication and Consistency Maintenance in P2P Systems", IEEE Transactions on Parallel and Distributed Systems, vol. 21, No. 1, Jan. 2010, pp. 100-113.*

Plavec et al., "Distributed File Replication System based on FreePastry DHT", 2004, 10 pages.*

Gilbert, S., et al., "Brewer's Conjecture and the Feasibility of Consistent, Available, Partition-Tolerant Web Services", 2002 ACM SIGACT News, 13 pgs.

European Patent Office, International Search Report and Written Opinion of the International Searching Authority issued in related International application No. PCT/EP2012/064966 dated Jan. 2, 2013.

* cited by examiner

METHOD AND SYSTEM TO MAINTAIN STRONG CONSISTENCY OF DISTRIBUTED REPLICATED CONTENTS IN A CLIENT/SERVER SYSTEM

FIELD OF THE INVENTION

The present invention relates in general to data processing systems and in particular to distributed client/server software architectures. Still more specifically, the present invention relates to a method and a system to maintain consistency between contents of cache files distributed over a plurality of processing nodes, while insuring their quasi real-time availability.

BACKGROUND OF THE INVENTION

The client/server model which has emerged in the late 1980s is a versatile and modular software architecture that was devised to improve usability, flexibility, interoperability, and scalability as compared to centralized, mainframe, time sharing computing that was the norm at that time. The client/server architecture has since progressively completely replaced the previous mainframe software architectures where all intelligence was within the central host computer and where users interacted with the host through dumb terminals. If mainframes are still however in use it is only as powerful servers in various client/server architectures where dumb terminals have also been replaced by intelligent graphical user interfaces (GUI) capable of self processing the received and transmitted data from/to servers.

Figure 1:
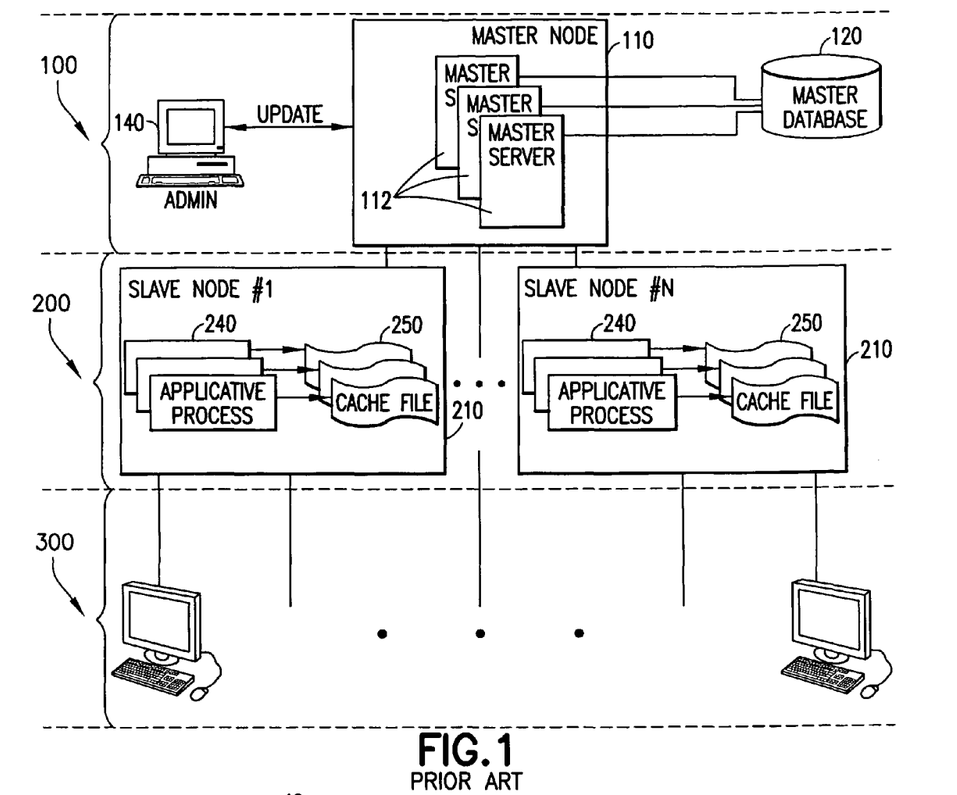
FIG. 1 illustrates an example of a standard distributed 3-tier data processing system.

In modern data processing systems, a client/server architecture largely in use and capable of supporting a large number of remotely located clients is the so-called 3-tier architecture. An example of such architecture is illustrated in FIG. 1. The master tier 100 is traditionally built around a database system 120, possibly a large or very large repository of all the data necessary to the daily operation of any business organization, company or enterprise in order to conduct all sorts of commercial and administrative operations. Database is mostly of the relational type, i.e., is under the control of a relational database management system or RDBMS. It is typically administrated through one or more master servers 112 by administrators of the data processing system from GUI's 140. Administrators are generally the sole users of the system authorized to update directly database contents.

The intermediate or middle tier of the exemplary 3-tier system of FIG. 1 is the application tier 200 from where all the specific software applications 240 of the organization, owner of the data processing system, are run. This collection of specific applications, often globally referred to as the middleware software, is the proprietary software of the organization. It is used to serve all organization's remote clients from its repository of data 120 through the master servers 110. Remote clients form the third tier 300 of the 3-tier architecture. Queries from client tier 300 are thus processed and responded by the specific applications of the intermediate tier 200 on data fetched from the master tier 100.

In a 3-tier architecture, when a larger number of remote clients need to be served, scalability of the system to maintain global performances is obtained by adding independent processing nodes in the middle tier so as to increase the overall processing power of the data processing system. Hence, the application tier 200 is generally comprised of several independent processing nodes that are referred to, in the following description, as slave nodes 210. Then, a common practice to prevent master tier 100 from being overwhelmed by too many data requests from an increasing number of slave nodes, is to have the applicative processes 240 working on pieces of data brought from the master database and stored in each application node as long as necessary. In the exemplary system of FIG. 1 this takes the form of cache files 250 on which the applicative processes 240 can work without having to incur long delays to get them from the master database through the master servers each time they are needed. In such a data processing system processing power and software applications are thus distributed, i.e., partitioned, on as many nodes 210 as necessary to reach the level of processing power necessary to serve all remote clients 300 of the system. So are the distributed cache files 250.

Figure 2:
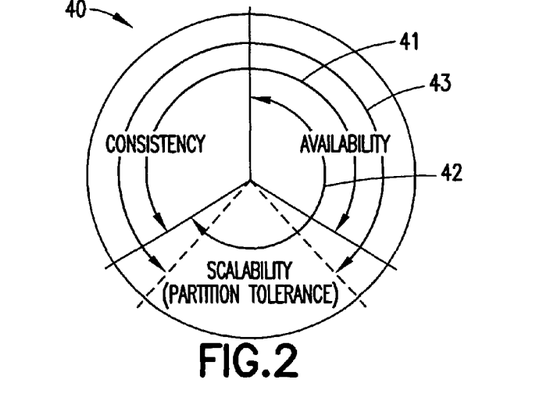
FIG. 2 discusses consistency, availability and scalability of distributed data processing systems.

In such a distributed computing environment it has been however proved that some desirable properties of a distributed data system cannot be all guaranteed simultaneously. As illustrated in FIG. 2 these expected properties 40 of a distributed data processing system are: consistency, availability and scalability. A theorem known as the CAP theorem, states that a distributed system can satisfy any two of these properties at the same time but not all three. CAP, which stands for: consistency, availability and partition tolerance; has been first conjectured in 2000 by E. Brewer, Professor at the University of California, Berkeley, the USA. A demonstration of the theorem has been later made in a paper authored by N. Lynch and S. Gilbert, published in 2002 in ACM SIGACT News, v.33 issue 2, pages 51-59. CAP partition tolerance property is tightly link to scalability since, as discussed above, overall power processing of the system is actually obtained in distributing, i.e., partitioning it over independent processing nodes.

Consistency and availability 41 can be fully met in 3-tier architectures only if the data used by the middle tier applications always come from the master database. This can be obtained as the expense of generating a very high down traffic from master tier 100 to application tier 200 just to answer queries from the client tier 300 also resulting in a very high occupancy of the master database to answer them. This comes in conflict with the administration and updating of the master database by administrative users (140) even though the proportion of writes into the database is generally relatively low. Access to the database and traffic on the network between data and application tiers are clearly bottlenecks that limit performances when the number of users of the client tier increases.

Availability and scalability 42 are achievable in a 3-tier architecture like the exemplary one shown in FIG. 1 by having distributed cache files 250 in order to overcome the above problems of database occupancy and high traffic between data and application tiers. However, in this case, there is no guarantee that cache file contents are consistent between slave nodes and with contents of the master database since they are distributed over independent computing nodes.

It is thus an object of the invention to bring a solution to this problem. In a 3-tier client/server architecture where client applications and replicated files are distributed over a plurality of independent slave nodes, the invention discloses a method and a system to maintain strong consistency between replicated file contents and full availability while preserving some scalability 43.

Further objects, features and advantages of the present invention will become apparent to the ones skilled in the art upon examination of the following description in reference to the accompanying drawings. It is intended that any additional advantages be incorporated herein.

SUMMARY OF THE INVENTION

According to one aspect, the invention describes a method of maintaining consistency of replicated files distributed over a plurality of independent processing slave nodes part of an application tier of a multi-tier client/server data processing system, the replicated files being distributed from a master node of a master tier. The method comprises the following steps performed with at least a processor:

receiving an update request in at least a master server of the master tier to update a master database of the data processing system;

based on said update generating and storing a new version of a replicated file stored in a shared file system of the master tier;

providing, a notification of availability of the new version of the replicated file to all slave nodes;

in each slave node, starting preloading from the shared file system the new version of the replicated file and upon completion of the preloading, acknowledging successful completion of the preloading;

only if all slave nodes acknowledge successful completion of the preloading then performing the following steps:

receiving at the master server a notification of preloading achievement;

from the master server, updating the master database with data of the new version of the replicated file thus committing the use of the new version of the replicated file by the master tier;

committing the use of the new version of the replicated file in a slave database of the application tier arranged for keeping track of all replicated file versions;

forwarding to the master server a notification of commitment of all slave nodes;

from master server, acknowledging achievement of the update in response to the received update request, if not all slave nodes acknowledge successful completion of the preloading, then receiving at the master node a notification of error without updating the master database and committing the use of the new version in the slave database.

Thus the invention provides an efficient solution for responding to a query for information in near real-time while ensuring a strong consistency over a possibly high number of nodes having the piece of information required for responding to the query. Therefore, the invention enables maintaining strong consistency, availability with a very short latency and enhanced scalability.

According to another aspect, the invention relates to a computer program product stored in a non-transitory computer-readable memory medium and performing the method according to any one of the preceding features.

According to another aspect, the invention relates to a method of maintaining consistency of replicated files containing business rules, said replicated files being distributed over a plurality of independent processing slave nodes forming a part of an application tier of a multi-tier client/server data processing system, the replicated files being distributed from a master node of a master tier, wherein the method comprises the following steps performed with at least a data processor:

receiving an update request in at least a master server of the master tier to update business rules stored in a master database of the data processing system;

based on said update generating and storing a new version of a replicated file stored in a shared file system of the master tier;

providing a notification of availability of the new version of the replicated file to all slave nodes;

in each slave node, starting preloading from the shared file system the new version of the replicated file and upon completion of the preloading, acknowledging successful completion of the preloading;

only if all slave nodes acknowledge successful completion of the preloading then performing the following steps:

receiving at the master server a notification of preloading achievement;

from the master server, updating the master database with data of the new version of the replicated file thus committing the use of the new version of the replicated file by the master tier;

if not all the slave nodes acknowledge successful completion of the preloading, then receiving at the master node a notification of error.

Another aspect of the invention is a distributed multi-tier client/server data processing system comprising an application tier and a master tier, the application tier comprising a plurality of independent processing slave nodes. The master tier comprises a master node arranged for distributing replicated files to the slave nodes, a master database and a master server. The master tier comprises a shared file system. The master server is arranged for receiving an update request to update the master database, to generate a new version of a replicated file stored in the shared file system and to store said new version in the shared file system. The system according to the invention also comprises a slave database connected to all slave nodes and arranged for keeping track of all replicated file versions. The system is configured for:

providing a notification of availability of the new version of the replicated file to all slave nodes;

in each slave node, starting preloading from the shared file system the new version of the replicated file and upon completion of the preloading, acknowledging successful completion of the preloading;

only if all slave nodes acknowledge successful completion of the preloading then performing the following steps: receiving at the master server a notification of preloading achievement; from the master server, updating the master database with data of the new version of the replicated file thus committing the use of the new version of the replicated file by the master tier; committing the use of the new version of the replicated file in the slave, database; forwarding to the master server a notification of commitment of all slave nodes; from master server, acknowledging achievement of the update in response to the received update request, if not all the slave nodes acknowledge successful completion of the preloading, then receiving at the master node a notification of error without updating the master database and without committing the use of the new version in the slave database.

BRIEF DESCRIPTION OF THE DRAWINGS

FIG. 4, which is comprised of FIGS. 4a and 4b, describes the steps of the method to achieve strong consistency among the distributed replicated files of a data processing system according to the invention.

DETAILED DESCRIPTION

Before providing a detailed description of the invention some advantageous features are mentioned.

It is first recalled that according to one aspect, the invention describes a method of maintaining consistency of replicated files distributed over a plurality of independent processing slave nodes part of an application tier of a multi-tier client/server data processing system, the replicated files being distributed from a master node of a master tier. The method comprises the following steps performed with at least a processor: receiving an update request in at least a master server of the master tier to update a master database of the data processing system; based on said update generating and storing a new version of a replicated file stored in a shared file system of the master tier; providing, a notification of availability of the new version of the replicated file to all slave nodes; in each slave node, starting preloading from the shared file system the new version of the replicated file and upon completion of the preloading, acknowledging successful completion of the preloading;

only if all slave nodes acknowledge successful completion of the preloading then performing the following steps: receiving at the master server a notification of preloading achievement; from the master server, updating the master database with data of the new version of the replicated file thus committing the use of the new version of the replicated file by the master tier; committing the use of the new version of the replicated file in a slave database of the application tier arranged for keeping track of all replicated file versions; forwarding to the master server a notification of commitment of all slave nodes; from master server, acknowledging achievement of the update in response to the received update request, if not all slave nodes acknowledge successful completion of the preloading, then receiving at the master node a notification of error without updating the master database and committing the use of the new version in the slave database.

Thus the invention provides an efficient solution for responding to a query for information in near real-time while ensuring a strong consistency over a possibly high number of nodes having the piece of information required for responding to the query. Therefore, the invention enables maintaining strong consistency, availability with a very short latency and enhanced scalability.

Optionally, the invention may comprise at least one of the following optional features:

In the present invention, what is designated as replicated files are complete files that are replicated from the master base and brought as such into the slave nodes to expedite the processing of the corresponding data by the applicative processes. They are not per se small pieces of data brought from a slower back end memory into a cache memory. In the context of the invention replicated files, also referred to as replica are indeed complete files on which an applicative process in a slave node can work without experiencing any miss of data to complete.

According to a particular but not limitative embodiment, the replicated files, also referred as replica, are cache files.

The step of providing a notification of availability of the new version of the replicated file to all slave nodes comprises the following steps:

forwarding from the master server a notification of availability of the new version of the replicated file to a synchronizing slave node taken among the slave nodes; broadcasting from the synchronizing slave node said notification of availability to all other slave nodes.

The step of acknowledging successful completion of the preloading comprises a step wherein the slave nodes acknowledge successful completion of the preloading to a server process of the synchronizing slave node.

Once all slave nodes acknowledge successful completion of the preloading to the server process of the synchronizing slave node and before the step of receiving at the master server a notification of preloading achievement, the synchronizing slave node forwards to the master server said notification of preloading achievement.

Upon completion of the step of committing the use of the new version of the replicated file by the master tier, the master node forwards a commitment notification to the synchronizing slave node and then the synchronizing slave node triggers the step of committing the use of the new version of the replicated file in the slave database.

At beginning of a transaction initiated by a query for information from a user, at least in each slave node involved in said transaction an applicative process interrogates the slave database and is instructed whether to switch from a current version of the replicated file to the preloaded new version of the replicated file.

Preferably, at beginning of a transaction initiated by a query for information from a user, in each slave node involved in said transaction an applicative process reads a tag of a current version of the replicated file, said tag indicating if a new version of the replicated file is available. If the tag indicates that a new version of the replicated file is available, then the applicative process interrogates the slave database and is instructed whether to switch from the current version of the replicated file to the new version of the replicated file.

The tag is set at successful completion of preloading of a new version of the replicated file and is reset at first reading by the applicative process.

The received update request comprises at least an update and the steps of generating and storing a new version of a replicated file in the shared file system is an incremental process including, in the master server, the steps of:

retrieving from the shared file system a current version of a replicated file and converting to an appropriate format the current version of the replicated file to be updated; applying the update onto the current version and converting and storing the new version of the replicated file into the shared file system.

The replicated files are compressed when stored in the shared file system.

The replicated files stored in the shared file system are decompressed and converted into an appropriate format by the master server when performing the incremental update and by the slave nodes upon preloading.

If not all slave nodes acknowledge successful completion of the preloading, then the master node sends a notification of error to an administrator that sent said update request.

The master database can be stored in a single machine or in a plurality of machines of the master tier. The slave database can be stored in a single machine or in a plurality of machines of the application tier.

The shared file system is a network-attached storage NAS.

According to an advantageous embodiment the replicated files contain business rules.

Advantageously, each business rule comprises a set of criterion and a content. Preferably, each criterion is associated to a weight, allowing thereby a search engine to identify the most relevant rule when a search is launched.

The set of criterion comprises at least one of: a point of sale, a country, a group of countries, a country of origin of a flight, a destination of a flight, a customer profile.

The multi-tier client/server data processing system is part of an inventory of a travel provider.

More generally, the slave nodes are connected to at least one of: an inventory of an airline, a departure control system of an airline, a revenue management system of an airline, a revenue accounting system of an airline, an electronic ticket server of an airline.

The following detailed description of the invention refers to the accompanying drawings. While the description includes exemplary embodiments, other embodiments are possible, and changes may be made to the embodiments described without departing from the spirit and scope of the invention.

Figure 3:
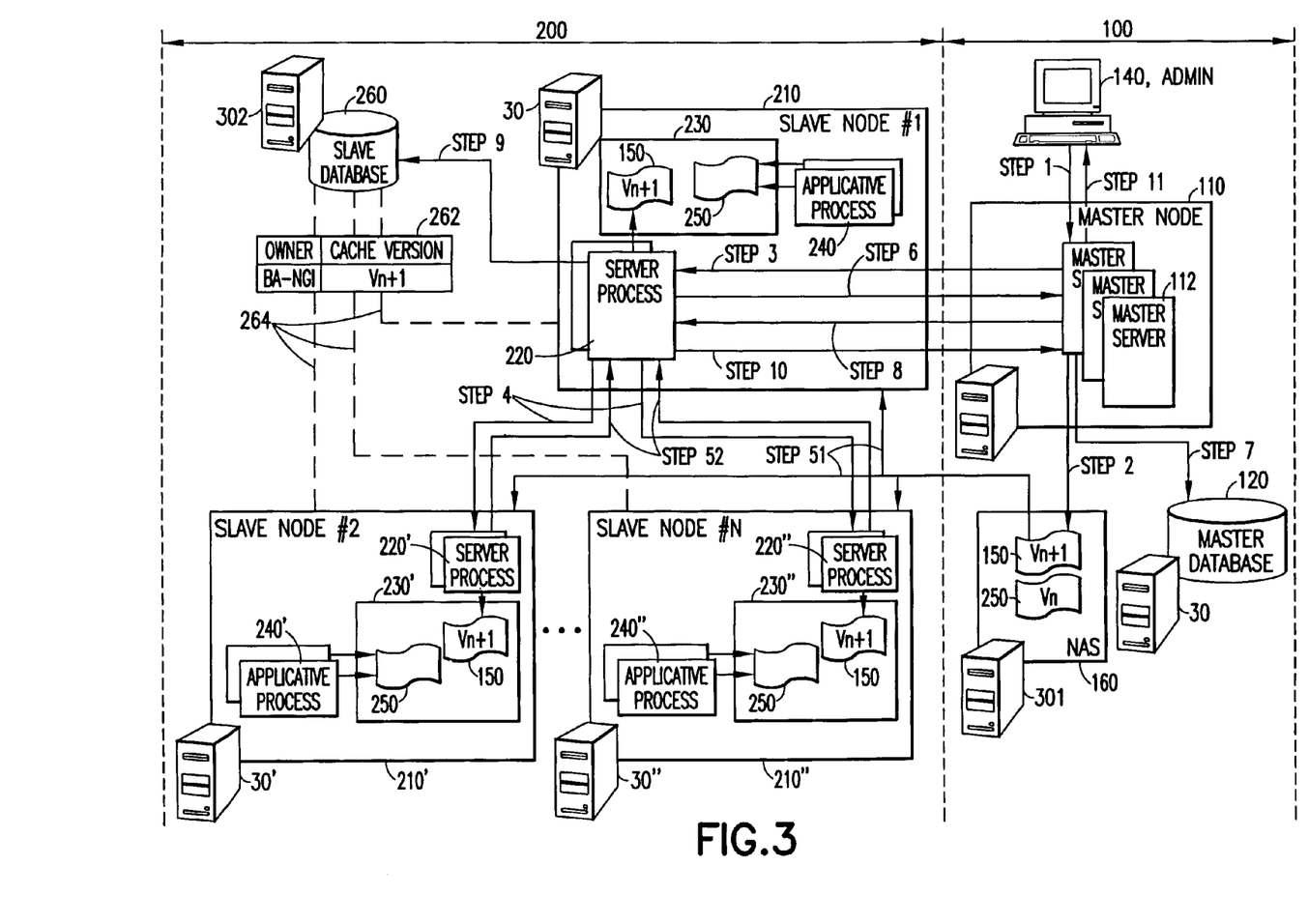
FIG. 3 illustrates an exemplary data processing system according to the invention in which contents of a master database is distributed into slave nodes in the form of replicated files.

FIG. 3 illustrates an exemplary distributed data processing system according to the invention comprising an application tier 200 and a master tier 100 also referred to as data tier 100. The application tier 200 comprises a plurality of independent processing slave nodes 210, 210', 210". The master tier 100 comprises a master node 110, a master database 120 and a master server 112. Contents of the master database 120 is distributed into slave nodes 210, 210', 210" in the form of replicated files 250, 150 so that corresponding pieces of data can be used by client applications 240, 240', 240" running on these slave nodes 210, 210', 210" without having to interrogate the master database 120.

The master tier 100 includes a master node 110 comprised of one or more servers 112. The master node 100 is in charge of managing the data repository of the system, i.e., the master data base 120, generally a large or very large database system that holds all the data necessary to conduct any type of large business activities including commercial and industrial applications and possibly covering also all sorts of administrative, educational and governmental activities too. In the airline and travel industry this can be for example a global distribution system or GDS. A GDS is any large data processing system put in place by companies of the travel industry to allow real-time access to airline fares, schedules, and seating availability and in general to any travel product. GDS's offer the capability to travel agencies and individuals, through numerous online travel sites, of booking reservations and generating travel tickets from all over the world.

Such a database 120 is administrated through the master server 112 by any authorized users from a user interface 140 of the system, generally a graphic user interface (GUI). Administrative users of the database are those that are permitted to update its contents. For example, in the case of a GDS, to add or modify business rules applying to the booking of travel tickets or to modify travel product offerings. This mostly consists in this case of updates brought to a current offering of travel products. Updates must thus be orderly replicated in the distributed replicated files used by client applications 240, 240', 240" running on the slave nodes 210, 210', 210".

The master tier 100 also includes a shared filed system 160, for example a network-attached storage or NAS system 160 aimed at holding the new versions of the replicated files that are generated upon request of an administrative user. The use of NAS 160 and of other components of the system is further explained in FIG. 4 which discusses the method of keeping coherent the various distributed replicated files of the slave nodes 210, 210', 210" with the contents of the master database 120.

As far as the client application tier 200 is concerned it is comprised of a plurality of slave nodes 210, 210', 210" each capable of serving plenty of remote end users which constitute the third tier of the system (not shown in FIG. 3). In the above example of a GDS these remotely located end-users include, for example, travel agents of conventional travel agencies and individual users of online travel sites connecting through a public network to those sites, i.e.: through the Internet. Many different software client applications that trigger the applicative processes 240, 240', 240" of the slave nodes 210, 210', 210" can thus be run from the replicated files brought into a shared memory 230, 230', 230" of each slave node 210, 210', 210". Hence, data needed by these applications are readily accessible by any of the applicative processes and need not to be duplicated for each of them thus drastically lowering memory usage. The range and number of applicative software products run on the slave nodes 210, 210', 210" is potentially very wide and in practice just limited by the computing resources of the nodes. It is largely dependent of the type of business conducted by the owner of the data processing system. In the travel industry, for a GDS, this includes specific applications like the electronic booking and ticketing services now offered to all travelers and the departure control of passengers in the airports. More common applications to any type of business include those concerning availability of goods and services, revenue management and revenue accounting. Hence, users of the application tier 200 are not limited to be customers but include also the professionals in charge of managing the assets of the company that owns the data processing system.

The client application tier 200 further includes a slave database 260 in charge with a specific server process task 220, 220', 220" present in each slave node 210, 210', 210" of controlling the deployment of new versions (Vn+1) 150 of the replicated files that are initially stored into the NAS system 160 by any of the master server 112 upon request of an administrative user of the data processing system. The slave database is essentially aimed at keeping track of the versions of the replicated files held in the shared memory 230, 230', 230" of the slave nodes 210, 210', 210" so that to enforce strong coherency between new 150 and current versions 250 of the replicated files distributed in the slave nodes 210, 210', 210" on one hand and with the master database 120 contents on the other hand. Advantageously, the slave database 260 only stores data related to the version of replicated files but does not store the content of the replicated files.

The process that allows this result to be reached over the exemplary data processing system shown in FIG. 3 is explained in FIG. 4 hereafter.

All the software components contributing to a system according to the invention are implemented and run from various individual computers or computerized platforms 30, 30', 30", that are also capable of communicating over one or more interconnected networks. Such a network is typically a local area network or LAN forming an enterprise network. LAN is operated under a standard set of communications protocols. In most cases the TCP/IP suite of protocols is employed which associates the transmission control protocol (TCP) of the Internet with the Internet protocol (IP) itself. Communications between the various computerized platforms and software components is in practice achieved through the exchange of messages. For example, EDIFACT (electronic data interchange for administration, commerce and transport) messages, a standard promoted by the United Nations (UN) organization and the international air transport association (IATA), can be used to establish a communication channel between the various components of the data processing system. Messages are typically exchanged over an enterprise service bus (not shown) also referred to as a service integrator (SI).

Figure 4A:
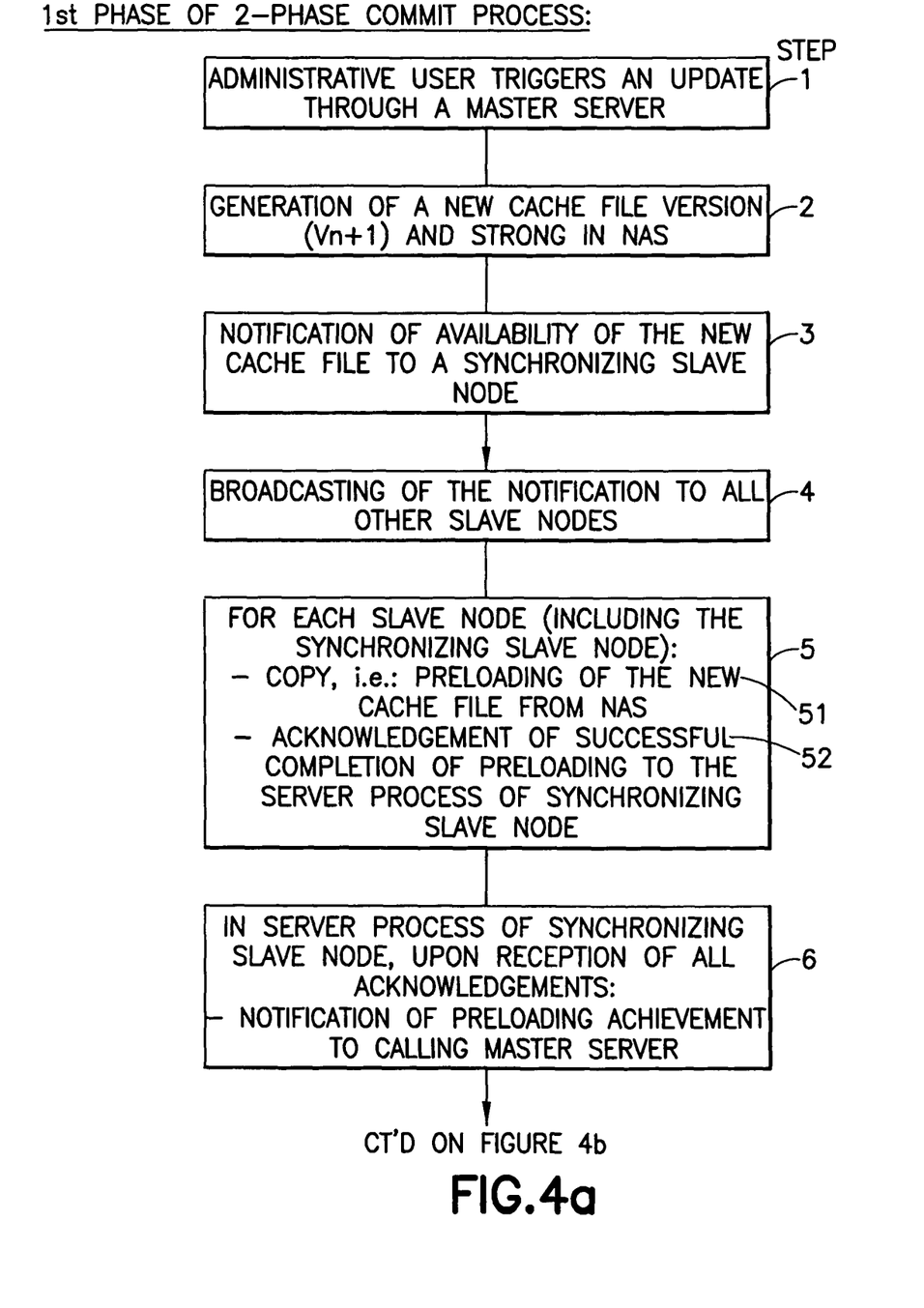
Figure 4B:
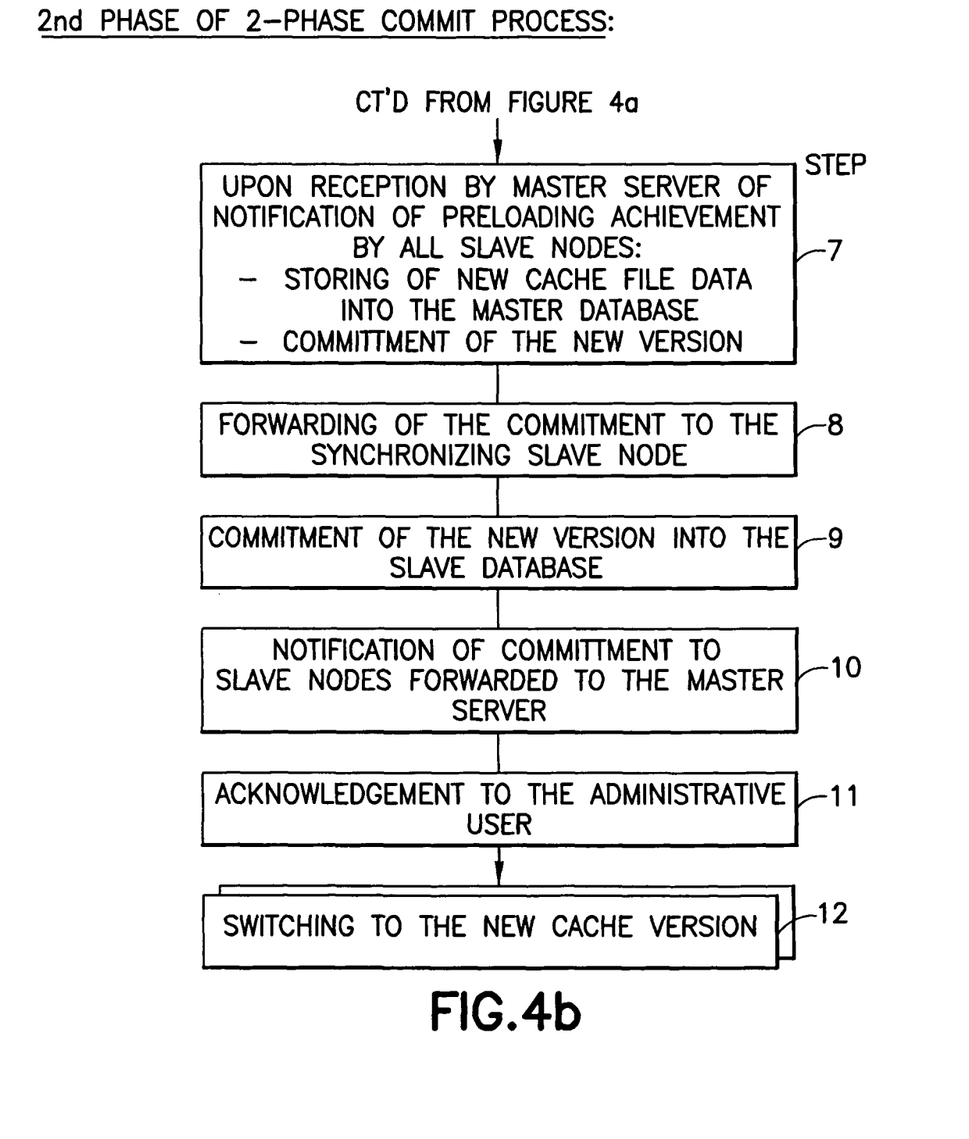

FIG. 4, which is comprised of FIGS. 4a and 4b, describes the steps of the method to achieve strong consistency among the distributed replicated files of a data processing system according to the invention, an example of which is illustrated and discussed in previous figure.

Figure 5:
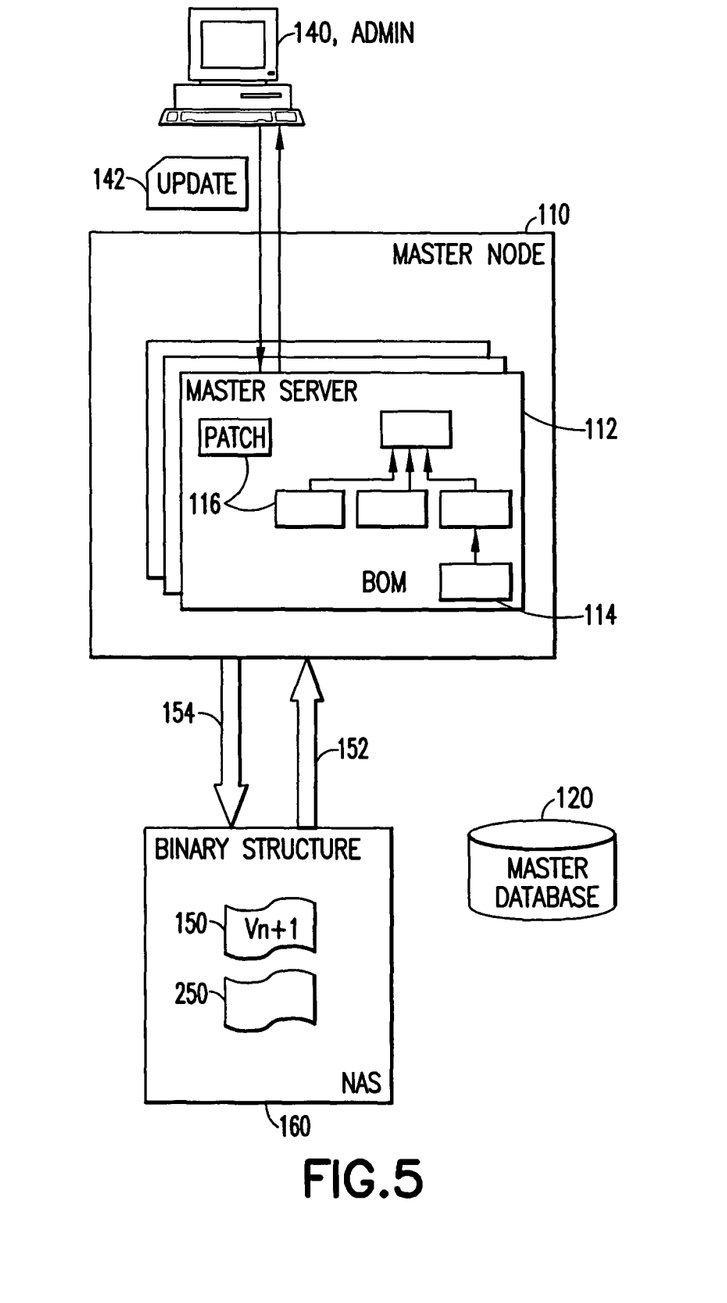
FIG. 5 describes the incremental update that is performed when creating a new version (Vn+1) of a replicated file.

First phase of the 2-phase commit process for updating data within the system is shown in FIG. 4a. It is triggered by an authorized administrative user that initiates an update transaction through one of the servers of the master node 100. This is done from a standard user interface, generally a graphic user interface (GUI), under the form of the sending 1 of an update request 142, as shown in FIG. 5, to the master server 112. This is the first step or step 1 of the process of updating data.

Step 2 is performed by the master server 112 in charge which, on reception of the update request 142, generates a new version 150 (Vn+1) of the corresponding replicated file and stores it in NAS, system 160. To expedite the generation of the new replicated file 150, an incremental update of the previous version 250 is advantageously performed. This is further explained in FIG. 5 hereafter. Whichever method is used, the end result of this step is that a new version (Vn+1) 150 of the replicated file is made available in NAS 160 to the entire data processing system.

Then, at step 3, a notification of availability of the new replicated file 150 must be performed. This is done through one of the slave nodes 210, 210', 210", e.g.: slave node 210 as shown in FIG. 3. To this end, a message is sent by the master server 112 in charge to a server process 220, 220', 220", i.e., a specific software task running on this node and on all other slave nodes 210', 210" as well. From that time on, the chosen slave node 210 then acts as a synchronizing point for all slave nodes 210, 210', 210" of the system. It is thus referred to as the "synchronizing slave node" 210 in the following description of the invention. From a master tier perspective all slave nodes play an identical role. The choice of a synchronizing slave node is then typically based on work load considerations.

The next step, i.e., step 4, consists in broadcasting to all other slave nodes 210', 210", under the control of the server process 220 task of the synchronizing slave node 210, the notification of availability of the new version 150 of the replicated file.

Then, at step 5, upon reception of the notification of availability of the new replicated file 150, each slave node 210, 210', 210", including the synchronizing slave node 210, performs the following two sub steps:

A copy, i.e., a preloading 51 of the newly available replicated file 150 is done from the NAS system 160 in which it has been previously stored by the master server 112 in charge of performing the updating.

Once preloading has properly ended an acknowledgement 52 of successful completion is sent back to the synchronizing slave node 210 by the server process 220, 220', 220" task of each slave node 210, 210', 210".

The server process task 220 of synchronizing slave node 210 is also in charge of collecting all acknowledgements of successful preloading completion. If, and when this is achieved, a notification of successful preloading achievement 6 in all slave nodes 210, 210', 210" is in turn forwarded to the master server 112 in charge. This is step 6 of the overall updating process. At this step, the new replicated file 150 has been preloaded in shared memory 230, 230', 230" of each slave node 210, 210', 210" and is thus potentially useable by the client applications running on these nodes. It is however held inactive until following steps of the updating process are performed.

Second phase of the process of updating data within the system is shown in FIG. 4b. The second phase starts upon reception by the master server, at step 6, of a notification of successful preloading achievement of new replicated file 150 by all slave nodes 210, 210', 210". This notification of preloading achievement is issued by the server process task 220 of the synchronizing slave node 210. Then, master server 112 in charge stores data of the new replicated file 150 version (Vn+1) into the master database 120 at step 7; thus, committing the use of the new version 150 to the whole data processing system.

Commitment step needs to be further accomplished, at step 8, by the sending of a commitment message issued by the master server 112 towards the server process 220 task of the synchronizing slave node 210 to inform this latter that the new preloaded replicated file (Vn+1) 150 is ready to be used.

On reception of the commitment message, at step 9, the new version 150 of the replicated data file is indeed also committed into the slave database 260 by the server process task 220 of the synchronizing node 210. Still, at this stage, the new version 150 already preloaded in each slave node 210, 210', 210", is not actually used by the client applications of slave nodes 210, 210', 210" until the switching step described hereafter occurs.

Nevertheless, at step 10, the master server 112 receives from the server process 220 task of the synchronizing node 210 a reply to inform it of the completion of the commitment into the slave database 260. This reply is further propagated, at step 11, to the data processing device 140 of the administrative user of the data processing system to inform said administrative user that the requested update 142 has indeed been committed and is as of now in effect.

The actual use of the new version 150 of the replicated file will however take effect only within the system when an applicative process actually needs it to respond to a query for information. In the present invention, a query for information is a query that requires retrieving data stored in the system in order to be fulfilled whereas an update request requires updating the stored data to be fulfilled. Thus a query for information is sent by end-user of the system such as a customer or a travel agent while update request 142 are sent by administrative users in charge of updating data related to products, services or information to be provided to end-users. Upon execution of an applicative process, the corresponding client application always checks 264, from the slave database 260, which version of the needed replicated file must be used. If a new version 150 is available a switching to this new version 150, already preloaded in shared memory, is then effected. The switching is a so-called atomic operation in the sense that it complies on this point with the ACID rules defined for database transactions, i.e.: atomicity, consistency, isolation and durability. Atomicity means that the switching is executed completely and is uninterruptible by any other process so that no delay is incurred by the client application. The same mechanism is applied on all client application processes. This solution guarantees full consistency of the data used from any of the distributed replica. As the switch is an atomic operation, there is no possible freezing of the applicative process while retrieving the new version 150 of a replicated file. Since preloading of the replicated file has occurred early in the execution of the updating process there is no further delay introduced when client application accesses the new version 150 of a replicated file.

The applicative process flow can be advantageously modified to optimize the number of requests to the slave database 260. Indeed, it is necessary to refer to this synchronization point only during transitions, between the preloading of a new cache version and the commit of this new version in the slave database 260.

To this effect, a "preload" indicator is added to the shared memory during the preloading operation. If this indicator is not present, the applicative process will access to the latest available version of cache, without performing a request to the slave database 260. Otherwise, a request to the slave database 260 is made and the version from slave database 260 is then used.

If the preloaded version has been committed in the slave database 260, then the switching operation described above is performed. In this operation, the "preload" indicator is removed from shared memory.

The mechanism described in previous figures which explained how the replicated files are made available to the slave nodes 210, 210', 210" in quasi-real time clearly distinguishes between two types of behaving for the two types of nodes of the system:

The master node 110 is the writer node which is possibly comprised of several master servers 112. Each of them is made capable of managing transactions issued through user interface 140 by any authorized administrative users of the data processing system. Management transactions are intended to eventually update the master database 120. To this end, as already discussed, a management transaction first creates a new replicated file version (Vn+1) 150 and stores it in the NAS system 160. The invention assumes that master node 110 has no knowledge of the topology of the slave nodes 210, 210', 210" and is not responsible to push data farther into the slave nodes 210, 210', 210". Thus scalability of the application 200 is totally independent from the master node 110.

Instead, slave nodes 210, 210', 210" get themselves a read-only copy of the replicated files by preloading them directly from the shared NAS system 160. Broadcasting information to the slave nodes 210, 210', 210" is done through the enterprise service bus or service integrator (SI) previously mentioned. To keep performance as high as possible the volume of data broadcasted is advantageously kept to a minimum. To achieve this objective, the method of the invention manages to only broadcast notifications of availability of new replicated files to the slave nodes 210, 210', 210" thus allowing them to copy the new replicated file 150 from a common shared file structure, the NAS 160, as explained in FIG. 4.

Quasi-real time replication implies that all client nodes are indeed able to switch to a new version 150 of the replicated file as soon as the management transaction ends, i.e., at step 11 as discussed in FIG. 4. This type of replication is also known as being an eager type of replication which is far more constraining than other types of less stringent replication often qualified of lazy replication. To obtain this result, the invention separates the flow of data into a control flow and a data flow. Hence, as already stated above, notifications of replicated file versions to use are broadcasted to the client nodes via the service integrator. Concerning data of replicated files they are made available from the shared file system, i.e., the NAS system 160. Only the control flow carrying versions needs to be conveyed and routed through the synchronizing slave nodes 210 to all other slave nodes 210', 210" of the application tier 200, while data can be transferred directly in parallel to each slave node 210, 210', 210". This architecture meets the requirement of creating a separation between servers 112 of the master node 100, i.e., the writers, and the slave nodes 210, 210', 210". Thus, writers need only to store the new data, first into the NAS shared file system, then in the master database 120 itself. Writers are not required to have any knowledge of the slave node 210, 210', 210" topology. Master servers, i.e., writers, rely on service integrator to route versioning information to the slave nodes 210, 210', 210".

Writing into the shared file structure of NAS is illustrated in FIG. 5. It describes the incremental update that is performed at step 2 when creating a new version (Vn+1) 150 of a replicated file.

Making available the replicated files, i.e., publishing them from a shared file structure such as a NAS system 160 provides additional benefits. The master server 112 in charge of handling the update request 142 can readily access the shared file structure of NAS to get 152 the latest version 250 of a replicated file currently used by all the slave nodes 210, 210', 210". The binary structure of NAS 160 is advantageously devised to facilitate retrieval of replicated files and also to minimize storage requirements. Thus, replicated files are possibly compressed to further limit the overall amount of storage necessary to hold all of them. A trade off between access time and storage requirements may have to be exercised that allows the retrieval of replicated files within an access time compatible with the expected performances of the data processing system while somehow limiting the overall amount of storage required. Network bandwidth consumption to transfer the files is also taken into account. Whichever compromise is adopted, the retrieved replicated files need to be converted by the master server to the business object model (BOM) 114 on which it can work into the server memory. Master server 112 can then perform an incremental update 116 in adding the requested update to the current version of a replicated file so as to imbed the modifications requested by an administrative user in the update request 142.

More precisely, the retrieved replicated file need to be converted by the master server to a C++ Business Object Model 114 into the server memory. Master server 112 can then perform an incremental update on this C++ structure 116 by adding the update. Then a new replicated file is built based on this new C++ structure.

In comparison to the retrieval of the corresponding information from the master database 120, this way of doing considerably speeds up the process of generating new versions of replicated files. An average improvement of one order of magnitude (x10) is achievable. The updated replicated file is finally converted and stored back 154 into the NAS shared file structure 160.

The following further discusses what strong consistency means in the context of the invention and how it is obtained with the system and the method previously described over all replicated files of slave nodes 210, 210', 210" each implemented on a different physical machine 30, 30', 30".

In a data processing system of the invention the master database 120 is assumed to be regularly updated. Although this figure may vary largely depending on the application of the invention, a typical frequency of updates to consider is in the order of a couple of times per minute. Each update produces a new version 150 of a replicated file (Vn+1). Then, strong consistency is achieved if, from the moment a replicated file of a given version, say version N, is read on a given slave node, any subsequent read on any other slave node 210', 210" indeed returns the same replicated file version N. Obviously, a higher version could also be read if, in the meantime, a new version 150 has already been distributed.

Consistency is achieved by providing to all slave nodes 210, 210', 210" a central access point that keeps track of the active versions of all replicated files. This access point is preferably implemented as a table of a database operated under a standard relational database management system (RDBMS) in order to guarantee that ACID properties are met. In a system of the invention, as shown in FIG. 3, this role is played by the slave database 260. An excerpt of the stored version table is shown 262. In the illustrated example, BA-NGI corresponds to Vn+1 which means that the version Vn+1 of the replicated file must be used, i.e., data of NGI application operated by the travel provider British Airways (BA). NGI, acronym for New Generation Inventory, discriminates which particular application is owner i.e., responsible, for given rule data. The central version table stored in the slave database is updated with the 2-phase commit process described in FIG. 4.

Then, at the start of each transaction initiated by a client application running on a slave node, the version of the active replicated file is fetched 264 from the version table 262 of the slave database 260. If the active replicated file version found is greater than the one currently used, the slave node 210, 210', 210" switches immediately to the new replicated file (Vn+1) 150. As explained in FIG. 4, this is possible because the updated replicated file 150 has already been preloaded in shared memory 230, 230', 230" of the slave node 210, 210', 210". It is worth noting here that if transaction initiated by a client application requires several accesses to a replicated file, the system manages to use the same version throughout the lifetime of this transaction even though a new version 150 becomes available in the mean time. This meets the isolation rule of the ACID set of rules applying to database transactions.

To provide an even higher level of performance to the access of data in shared memory the above interrogation 264 of the slave database at the beginning of each transaction may optionally be skipped. In this case, replicated files stored in shared memory need to contain a tag or flag that indicates whether a new version 150 is available or not. Thus, it is this tag which is first checked at beginning of each transaction instead of systematically interrogating the slave database. If the tag indicates that no new version 150 is available, then the current replicated file is used. If the tag indicates that a new version 150 is indeed available, then the version table 262 is read from the slave database so that the applicative process 240, 240', 240" can switch to the new preloaded replicated file (Vn+1). The tag, that was set when preloading of new version 150 was done, is reset when the client application has finished to process its current transaction. In an environment where numerous processes are accessing to the same replicated file (s), only a few processes will have to consult the database before one of them resets the tag.

In order to work in a production environment the above described mechanism has also to be fault tolerant. Full consistency can only be reached if replicated files have actually been all successfully preloaded, i.e., distributed and mapped into shared memories of all slave nodes before management transaction can be committed in the master database. This is mandatory to ensure that slave nodes are indeed able to switch to the new replicated file in an atomic manner. Otherwise, there may be error cases where some slaves would be able to switch to the new version and others not, thereby producing a lack of consistency. Hence, to prevent this situation from happening, if for any reason distribution fails on any given slave node, the whole transaction is aborted and an error is sent to the end user in response to the update request. This is possible because of the 2-phase commit process put in place and described in FIG. 4. Between consistency and availability the invention put an emphasis on consistency. It is important to highlight that read availability from slave nodes is still however fully guaranteed and query for information can be fulfilled in near real time. The only part of availability that is possibly compromised is the update/management of data. In the context of the invention this is far less critical than read availability and strong consistency of distributed replicated files across all slave nodes. The successful distribution of replicated files to each slave node is thus a critical part of the invention. The enterprise service bus or service integrator (SI) previously discussed is used to make sure that an image of the group of slave nodes actively participating to the client application tier is always available. When a slave node joins or leaves the group, the image is updated accordingly so that the method of the invention can be carried out properly.

While there is shown and described the present preferred embodiment of the invention, it is to be distinctly understood that this invention is not limited thereto but may be variously embodied to practice within the scope of the following claims.

What is claimed is:

1. A method of maintaining consistency between copies of a replicated file distributed over a plurality of nodes of a data processing system, the method comprising:

receiving an update request in a master server, the update request requesting that the replicated file be updated in a master database;

generating and storing a new version of the replicated file in a shared file system based on the update request;

providing a notification of availability of the new version of the replicated file to a plurality of slave nodes;

in response to receiving the notification of availability at each slave node, preloading a copy of the new version of the replicated file from the shared file system into a memory of each slave node, and upon completion of the preloading, acknowledging successful completion of the preloading; and committing the data processing system to use the new version of the replicated file only if each slave node of the plurality of slave nodes acknowledges successful completion of the preloading to the master server.

2. The method of claim 1 wherein providing the notification of availability of the new version of the replicated file to the plurality of slave nodes comprises:

forwarding, from the master server, the notification of availability of the new version of the replicated file to a synchronizing slave node selected from the plurality of slave nodes; and broadcasting from the synchronizing slave node the notification of availability to the other remaining slave nodes of the plurality of slave nodes.

3. The method of claim 2 wherein each slave node acknowledges successful completion of the preloading to a server process of the synchronizing slave node.

4. The method of claim 3 further comprising:

in response to all the other remaining slave nodes of the plurality of slave nodes acknowledging successful completion of the preloading to the server process of the synchronizing slave node, forwarding a notification of preloading achievement from the synchronizing slave node to the master server.

5. The method of claim 2 wherein committing the data processing system to use the new version of the replicated file comprises:

forwarding a commitment notification to the synchronizing slave node from the master server; and in response to receiving the commitment notification, triggering with the synchronizing slave node the use of the new version of the replicated file in a slave database.

6. The method of claim 5 wherein triggering the use of the new version of the replicated file in the slave database comprises:
updating a version table in the slave database with a version number of the new version of the replicated file.

7. The method of claim 1 further comprising:
in response to a transaction initiated by a query for information from a user, interrogating a slave database at each slave node involved in the transaction; and
based upon the interrogation, instructing each slave node involved in the transaction whether to switch from a current version of the replicated file to the preloaded new version of the replicated file.

8. The method of claim 7 wherein the slave database only stores data related to a version of replicated files.

9. The method of claim 1 further comprising:
in response to a transaction initiated by a query for information from a user, reading in each slave node involved in said transaction a tag of a current version of the replicated file, the tag indicating if a new version of the replicated file is available;
in response to the tag indicating that a new version of the replicated file is available, interrogating a slave database of each slave node involved in the transaction; and
in response to being interrogated, instructing the interrogating slave node whether to switch from the current version of the replicated file to the new version of the replicated file.

10. The method of claim 9 wherein the tag is set at successful completion of preloading of the new version of the replicated file, and is reset at a first reading by the slave node.

11. The method of claim 1 wherein the received update request includes an update for the replicated file, generating and storing the new version of the replicated file in the shared file system is an incremental process in the master server comprising:
retrieving from the shared file system a current version of the replicated file;
converting the current version of the replicated file to an appropriate format to be updated;
applying the update to the current version of the replicated file to generate the new version of the replicated file; and
converting the new version of the replicated file for storage into the shared file system; and
storing the new version of the replicated file into the shared file system.

12. The method of claim 11 wherein the replicated file is compressed when stored in the shared file system, and converting the current version of the replicated file to the appropriate format comprises:
decompressing the current version of the replicated file stored in the shared file system with the master server; and
preloading the copy of the new version of the replicated file includes decompressing the new version of the replicated file with the each slave node.

13. The method of claim 1 further comprising:
in response to at least one of the slave nodes of the plurality of slave nodes failing to acknowledge successful completion of the preloading, sending an error notification from the master server to a sender of the update request.

14. The method of claim 1 wherein the shared file system comprises a network-attached storage (NAS).

15. The method of claim 1 wherein committing the data processing system to use the new version of the replicated file comprises:
updating the replicated file in the master database to the new version of the replicated file;
updating data in a slave database configured to keep track of replicated file versions used by the plurality of slave nodes, the data identifying a version of the replicated file to be used by the plurality of slave nodes; and
in response to updating the data identifying the version of the replicated file in the slave database, receiving in the master server a notification of commitment of each slave node of the plurality of slave nodes to use the new version of the replicated file.

16. The method of claim 15 further comprising:
in response to each slave node of the plurality of slave nodes acknowledging successful completion of the preloading, receiving a notification of preloading achievement in the master server, wherein updating the replicated file in the master database to the new version of the replicated file is in response to receiving the notification of preloading achievement.

17. A computer program product comprising:
a non-transitory computer-readable storage medium including program instructions that, when executed by one or more processors, cause the one or more processors to:
receive an update request in a master server, the update request requesting that a replicated file be updated in a master database;
generate and store a new version of the replicated file in a shared file system based on the update request;
provide a notification of availability of the new version of the replicated file to a plurality of slave nodes;
in response to receiving the notification of availability at each slave node, preload a copy of the new version of the replicated file from the shared file system into a memory of each slave node, and upon completion of the preloading, acknowledge successful completion of the preloading; and
commit the data processing system to use the new version of the replicated file only if all slave nodes of the plurality of slave nodes acknowledge successful completion of the preloading.

18. A method of maintaining consistency between copies of a replicated file containing business rules, the copies of the replicated file being distributed over a plurality of nodes of a data processing system, the method comprising:
receiving an update request in a master server to update business rules stored in a master database;
generating and storing a new version of the replicated file in a shared file system based on the update request;
providing a notification of availability of the new version of the replicated file to a plurality of slave nodes;
in response to receiving the notification of availability at each slave node, preloading a copy of the new version of the replicated file from the shared file system into a memory of each slave node, and upon completion of the preloading, acknowledging successful completion of the preloading; and
committing the data processing system to use the new version of the replicated file only if all slave nodes of the plurality of slave nodes acknowledge successful completion of the preloading.

19. The method of claim 18 wherein each business rule comprises a set of criteria and a content.

20. The method of claim 19 wherein each criterion of the set of criteria is associated to a weight.

21. The method of claim 19 wherein the set of criteria comprises a point of sale, a country, a group of countries, a country of origin of a flight, a destination of a flight, or a customer profile.

22. The method of claim 18 wherein an inventory of a travel provider comprises the data processing system.

23. The method of claim 18 wherein at least one of the slave nodes is connected to an inventory of an airline, a departure control system of an airline, a revenue management system of an airline, a revenue accounting system of an airline, or an electronic ticket server of an airline.

24. The method of claim 18 wherein committing the data processing system to use the new version of the replicated file comprises:

committing the use of the new version of the replicated file in a slave database configured to keep track of all replicated file versions;

forwarding a notification of commitment of all slave nodes to the master server; and from the master server, acknowledging achievement of the update request in response to the received update request.

25. A distributed data processing system comprising:

a master tier including a master server and a shared file system; and an application tier including a plurality of slave nodes, each slave node having a memory and being communicatively coupled to the master tier, wherein the master server is configured to provide a notification of availability of a new version of a replicated file in the shared file system to the plurality of slave nodes;

each slave node-of the plurality of slave nodes is configured to, in response to receiving the notification of availability, preload a copy of the new version of the replicated file from the shared file system, and upon completion of the preloading, acknowledge successful completion of the preloading; and the master server is further configured to only commit the data processing system to use the new version of the replicated file in response to all slave nodes acknowledging-successful completion of the preloading.

* * * * *

UNITED STATES PATENT AND TRADEMARK OFFICE
CERTIFICATE OF CORRECTION

PATENT NO. : 8,495,017 B2
APPLICATION NO. : 13/136576
DATED : July 23, 2013
INVENTOR(S) : Caroline Lafont et al.

It is certified that error appears in the above-identified patent and that said Letters Patent is hereby corrected as shown below:

In the Claims

Column 15, claim 12, line 59, after "with" delete "the".

Column 18, claim 25, line 12, change "node-of" to --node of-- and line 21, change "acknowledging-successful" to --acknowledging successful--.

Signed and Sealed this
Fifth Day of November, 2013

Teresa Stanek Rea
*Deputy Director of the United States Patent and Trademark Office*